United States Patent [19]

Goudy, Jr.

[11] 4,379,681
[45] Apr. 12, 1983

[54] FLUID PUMP WITH DUAL DIAPHRAGM CHECK VALVES

[75] Inventor: Paul R. Goudy, Jr., 8920 Hampton Ave., Milwaukee, Wis. 53225

[73] Assignees: Paul R. Goudy, Jr., Shorewood, Wis.; Bruce J. Landis, Sunrise, Fla.; Kenneth J. Landis, University Heights, Ohio

[21] Appl. No.: 109,547

[22] Filed: Jan. 4, 1980

[51] Int. Cl.³ .................. F04B 21/02; F04B 39/10; F04B 43/04
[52] U.S. Cl. .................. 417/560; 417/566; 417/413; 137/512.15; 137/512.4
[58] Field of Search ........... 417/560, 566, 413; 137/512.15, 512.4

[56] References Cited

U.S. PATENT DOCUMENTS

| | | | |
|---|---|---|---|
| 2,980,032 | 4/1961 | Schneider | 137/512.4 X |
| 3,496,872 | 2/1970 | Reister et al. | 417/566 X |
| 3,547,561 | 12/1970 | Lavon | 417/560 X |
| 3,814,552 | 6/1974 | Guggenheim et al. | 417/413 |
| 4,152,098 | 5/1979 | Moody | 417/413 |
| 4,181,477 | 1/1980 | Litt | 417/560 |

Primary Examiner—Richard E. Gluck
Attorney, Agent, or Firm—Maky, Renner, Otto & Boisselle

[57] ABSTRACT

A fluid pump has an inlet, an outlet, a pumping chamber, pumping means, and inlet and outlet check valves. In one embodiment each check valve is formed by a flexible member positioned between a pair of relatively rigid members, the latter each having an opening bounded by a surface portion thereof with such surface portions cooperating with the flexible member to provide a fluid-tight seal therewith. The flexible member includes a movable means which moves upon flexure of such member in response to a pressure differential across the same and being operative when moved substantially to the respective extreme positions to block fluid flow between respective passages or to pass fluid flow between such passages. Moreover, a contact carrier is provided for repeatably intermittently closing contacts and opening the same. Such carrier is formed by a curved arm having a tendency to assume a natural condition, e.g. in a flat plane, when unstressed, a resilient characteristic operative generally perpendicularly to that in which the radius of curvature is taken, and a pair of ends, one being relatively fixed and the other relatively movable. A contact is affixed to the movable end. Force applied to the movable end in a direction parallel to that in which the resilient characteristic is operative causes resilient deformation of the curved arm to move the contact; and the natural resiliency of the curved arm moves the contact back to its original position when the force has been removed.

3 Claims, 10 Drawing Figures

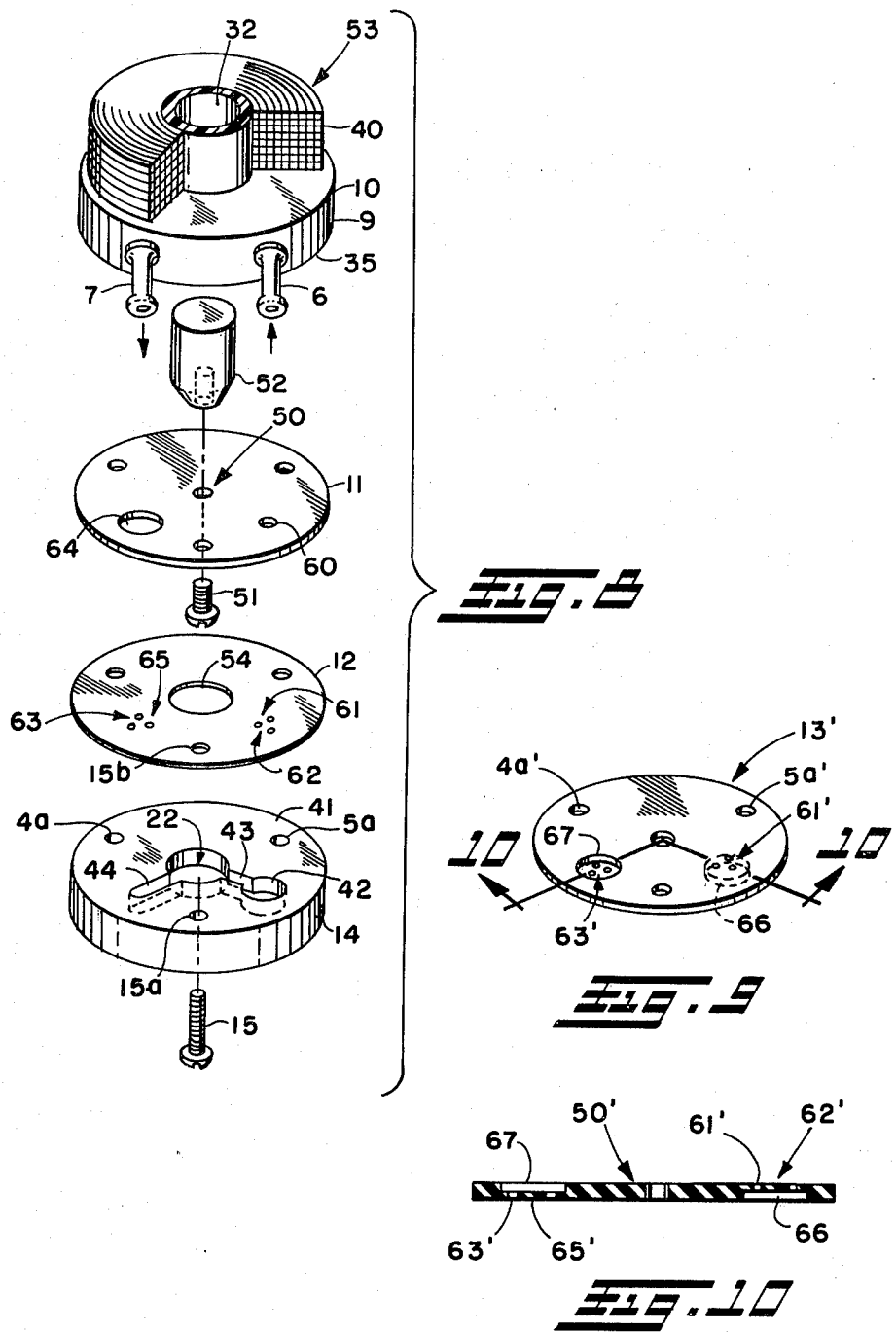

FLUID PUMP WITH DUAL DIAPHRAGM CHECK VALVES

TECHNICAL FIELD

The present invention is directed to fluid pumps and, more particularly, to intermittently energized fluid pumps capable of producing a relatively sustained average high pressure output at relatively low flow rates. Moreover, the invention is directed to an improved check valve and to an improved contact carrier assembly for intermittently energizing pumps or the like.

BACKGROUND OF PRIOR ART

Intermittent input, average output types of pumps, also known as impulse pumps, have been known. Such pumps may have a movable pumping member that is moved to one position to load fluid into a pumping chamber and to another position to pump fluid from such pumping chamber. The loading action may occur in response to an intermittent work input, such as one derived using a solenoid and an electrical energy input, and the work output or pumping action may be effected by a spring or other work or energy storage device into which work (energy) had been stored during energization of, for example, the solenoid.

Various types of mechanical check valve arrangements have been used in the past to control the flow of fluid, vis-a-vis such prior pumps. Also, a movable contact arrangement was necessary to effect intermittent energization of the solenoid.

Some disadvantages encountered in the prior pumps of the subject type have been fluid leakage due to the multiple complex elements utilized and the relatively high cost also for the same reason. Furthermore, undesirable energy dissipation may occur in the prior pumps where the contact alignment is not maintained constant during multiple operations; accordingly, the contacts often become prematurely worn due to arcing and/or uneven current flow during multiple uses. Additionally, due to the frequent use of separate pump diaphragms, sealing gaskets, sealing measures taken at the check valves, etc., not only are the leakage and cost affected substantially, but the labor required to manufacture such prior pumps becomes excessive and expensive.

BRIEF SUMMARY OF INVENTION

In accordance with the present invention, a fluid pump is provided having a fluid inlet and outlet, a pumping chamber, inlet and outlet check valves, respectively, for passing fluid in a single direction from the inlet to the pumping chamber and from the latter to the outlet and for blocking fluid flow in the opposite directions, and pumping means for drawing fluid from the fluid inlet via the inlet check valve into the pumping chamber and for pumping fluid from the pumping chamber via the outlet check valve to the fluid outlet. Preferably an energy or work storage device, such as a spring, effects a substantially constant pumping pressure on fluid in the pumping chamber except during the brief time that an actuator causes the input of energy or work into such storage device and preferably the simultaneous drawing of fluid into the pumping chamber.

In accordance with one aspect of the invention at least one of the inlet and outlet check valves comprises a self-sealing check valve assembly formed by first and second relatively rigid members, each having a plate-like surface facing the other with a fluid passage opening at such surface and bounded by boundary portions of the surface, a flexible means positioned between the plate-like surfaces for cooperating with the boundary portions to provide a substantially fluid-tight seal therewith, and the flexible member including a movable portion for moving upon flexure of the flexible member in response to a pressure differential across the latter, the movable portion including a means operative when the flexible member is moved substantially to its opposite extreme positions to block fluid flow between the fluid passages and to permit such fluid flow, respectively.

In accordance with another aspect of the invention such flexible member is just one part of an overall flexible member that provides a flexible portion for the other check valve, a flexible portion as a pumping diaphragm, and a remaining portion for providing a gasket-type fluid sealing function.

In accordance with an additional aspect of the invention, an improved carrier assembly, particularly intended to carry a movable contact for movement intermittently to energize the pumping means, is provided. Such carrier includes a curved arm having a tendency to assume a natural condition when at least substantially unstressed, having a resilient characteristic operative generally in a direction at least approximately perpendicular to that in which a radius of curvature of the curved arm is taken, and having a pair of ends, one end being relatively fixedly supportable and the other being relatively movable with respect to the one end, and a means for applying force to such other end in a direction at least approximately parallel to that in which such resilient characteristic is generally operative causing resilient deformation of the curved arm to cause movement of such other end with respect to such one end. The curved arm has a tendency to reassume its natural condition when not having been stressed beyond its elastic limit by such force and such force is removed and due to its length, say in a flat plane, can undergo substantial distance of movement of the movable end without exceeding its elastic limit, thus increasing the possible input and output stroke distance of the pumping mechanism. Several advantages inure to the carrier, including, for example, repeatability of movement of the movable contact supported thereby, the maintaining of the movable contact in a single plane over a relatively large movement distance proximate a relatively fixed contact, thereby allowing the contact surfaces to be relatively planar to provide a relatively large surface area connection therebetween for optimum current flow characteristics therebetween.

With the foregoing in mind, a principal object of the invention is to provide a pump that is improved in the noted respects.

Another object is to minimize the power requirements of a pump.

An additional object is to provide longevity for a pump.

A further object is to minimize leakage from a pump.

Still another object is to provide a relatively high pressure output over a relatively wide range of flow rates, including a relatively low flow rate, from a pump as well as to provide a well balanced or averaged output from an impulse type pump.

Still an additional object is to provide an improved check valve.

Still a further object is to provide a resilient carrier assembly, especially for an electrical contact, with relatively accurate motion repeatability characteristics.

Even another object is to minimize the cost for a pump, including the labor and materials costs.

These and other objects and advantages of the invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF DRAWINGS

In the annexed drawings:

FIG. 8 is an exploded fragmentary perspective view of the pump of FIG. 1;

FIG. 9 is a perspective view of a modified flexible member for use in a pump in accordance with the invention; and FIG. 10 is a section view of the flexible member looking generally in the direction of the arrows 10—10 of FIG. 9.

DESCRIPTION OF THE PREFERRED EMBODIMENT

Figure 1:
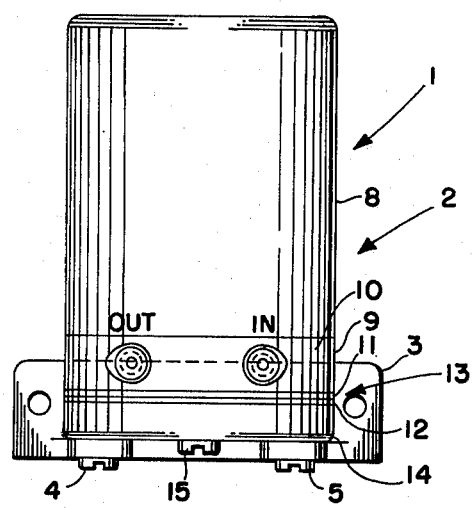
FIG. 1 is a front elevation view of a fluid pump in accordance with the present invention.
Figure 2:
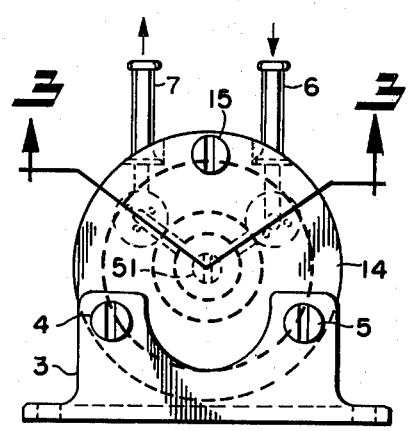
FIG. 2 is a bottom plan view of the pump of FIG. 1.

Referring now in detail to the drawings, wherein like reference numerals designate like parts in the several figures, and initially to FIGS. 1 and 2, a fluid pump in accordance with the present invention is generally indicated at 1. The pump 1 includes an exterior shell 2 formed by the multiple parts exteriorly visible, and a mounting bracket 3 fastened to the pump by screws 4, 5 in holes 4a, 5a seen in the several parts shown in the other figures to facilitate mounting the pump 1 to external support means, not shown. A fluid inlet 6 and a fluid outlet 7 of conventional design protrude from the shell 2 for facile attachment to hoses or the like in conventional manner for providing fluid from an external supply, not shown, to the inlet 6 and conducting pumped fluid from the outlet 7 to other equipment, not shown, for use thereat.

The shell 2 is formed by external walls of a hollow case or cover 8, a cylinder-like wall 9 of a bobbin 10, the two portions 11, 12 of a composite flexible member 13, and a rigid bottom cover plate 14. Preferably the case 8, bottom plate 14, and mounting bracket 3 are electrically conductive and are connected in electrical common by the screws 4, 5 to provide a ground circuit path for an actuator located within the pump 1, such actuator being of the type that produces output work in response to an electrical input. Moreover, in the preferred embodiment and best mode of the invention, such actuator is a solenoid; accordingly, the bobbin 10 preferably is of electrically non-conductive material to provide a proper support for the solenoid windings within the pump 1. The two portions 11, 12 of the flexible member 13 preferably are of Neoprene material or like material that has satisfactory flexibility and resiliency for providing gasket-type fluid sealing function, check valve function, and pumping function, as will be described further below. A further screw 15 in holes 15a, and still other ones, not shown, if desired, provide additional fastening force to secure the various portions of the fluid pump 1 as an integral structure.

Turning now particularly to FIGS. 2–8, fundamentally the pump 1 includes, in addition to the inlet and outlet 6, 7, an inlet check valve 20, an outlet check valve 21, a pumping chamber 22, a pumping mechanism 23 for drawing fluid from the inlet 6 and via the inlet check valve 20 into the pumping chamber 22 and for pumping fluid from the latter via the outlet check valve 21 to the outlet 7, and an energy controlling mechanism 24 to control input of energy to the pumping mechanism 23.

Figure 3:
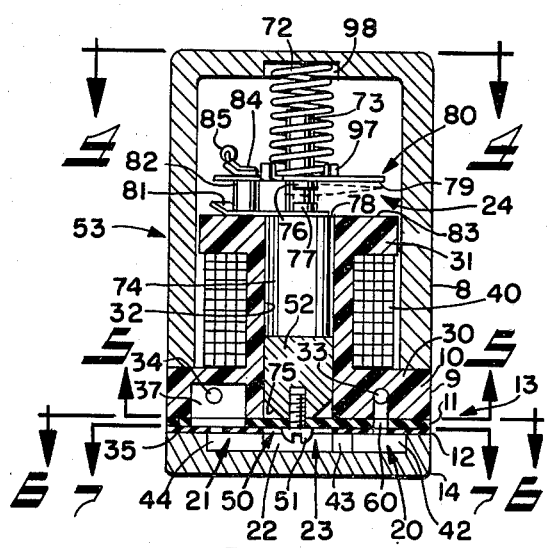
FIG. 3 is an upright section view of the pump looking generally in the direction of the arrows 3—3 of FIG. 2.
Figure 5:
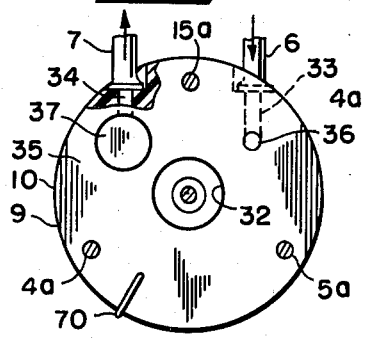
FIG. 5 is a bottom plan view of the rigid bobbin and plate-like surface thereof looking generally in the direction of the arrows 5—5 of FIG. 3.
Figure 6:
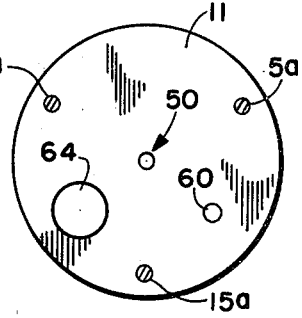
FIG. 6 is a top plan view of the pumping portion of the composite flexible member looking generally in the direction of the arrows 6—6 of FIG. 3.
Figure 7:
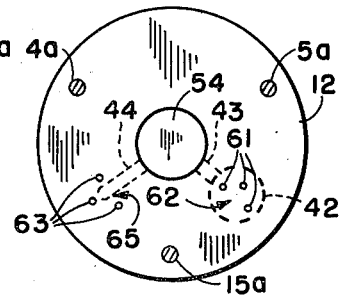
FIG. 7 is a top plan view of the second portion of the composite flexible member looking generally in the direction of the arrows 7—7 of FIG. 3.

As is seen in FIG. 3, the lower flange 30 of the bobbin 10 has a larger radial thickness than the upper flange 31, which fits within the case 8. The flange is substantially solid (except as shown and described further below), with a central passage 32, fluid inlet and outlet passages 33, 34 leading and fluidically connected to the respective fluid inlet and outlet 6, 7, a rigid plate-like bottom surface 35, inlet check valve inlet flow path 36 (leading from the passage 33 to open at the surface 35), and outlet check valve outlet chamber 37 (also opening at the surface 35 and leading to the fluid outlet passage 34). Wrapped around the relatively narrow mid portion of the bobbin 10 between the flanges 30, 31 is a plurality of conductor turns generally designated 40 forming the electromagnetic portion of a solenoid actuator that is energizable to provide a work input for the pump 1.

The bottom cover plate 14, which is seen most clearly in FIGS. 3 and 8, has a plate-like top surface 41 that preferably is rigid and flat like the plate-like bottom surface 35 of the bobbin flange 10 to mate in opposition with respect to the latter separated only by the flexible member 13. The bottom cover plate 14 has formed therein, for example by machining or during the molding or casting thereof, an inlet check valve outlet chamber 42 which opens to the surface 41, a loading flow passage 43, the pumping chamber 22, and an outlet check valve fluid inlet passage 44. It is the purpose of the loading flow passage 43 to load fluid drawn by the pumping mechanism 23 into the pumping chamber 22 from the inlet check valve 20. It is the purpose of the outlet check valve fluid inlet passage 44 to conduct fluid from the pumping chamber 22 to the outlet check valve 21 for delivery out to the fluid outlet 7.

The remaining fluidics portion of the pump 1, in addition to the lower flange 30 and cover plate 14 together with the flow passages and chamber therein, is the flexible member 13, which is cooperative with the plate-like surfaces 35, 41 and respective open areas therein to form the inlet and outlet check valves 20, 21. Moreover, the central area 50 of the upper flexible portion 11 provides a pumping diaphragm function. For that purpose the central area 50 is fastened by a screw or other fastener 51 passing through a hole 51a in the same to the iron core 52 or other movable member of the pump actuator, in the illustrated preferred embodiment a solenoid 53. Therefore, as the core 52 moves upward in the bobbin central passage 32 under the electromagnetic force created by the energized turns 40, the central area 50, which preferably has a resilient characteristic to facilitate deformation thereof, also is moved up to draw fluid into the pumping chamber 22. Similarly, when the core 52 is moved downward, the central area 50 pumps fluid from the pumping chamber 22. The lower flexible portion 12 has a central opening 54 to facilitate the downward movement of the central area pumping diaphragm 50. Moreover, preferably both flexible portions 11, 12 have a resilient characteristic to facilitate their being urged into fluid-tight sealed engagement with each other and with the respective bottom and top surfaces 35, 41 where they form boundaries about the central passage opening 32 in the former and the pumping chamber 22 in the latter.

For the inlet check valve 20 the upper flexible portion 11 has a hole 60 and the lower flexible portion 12 has three holes generally designated 61. The hole 60 is aligned with the inlet check valve inlet flow path 36, and the holes 61 are aligned above the inlet check valve outlet chamber 42; but the hole 60 is not aligned with any of the holes 61-rather, the hole 60 directly faces a solid area 62 of the lower flexible member portion 12. When the pumping mechanism 23, including particularly the central area pumping diaphragm 50 draws fluid into the pumping chamber 22, a relatively low pressure is created in the inlet check valve outlet chamber 42 drawing the solid area 62 of the lower flexible portion 12, which preferably is resilient to facilitate such movement, away from the upper flexible portion 11 to permit flow of fluid through the hole 60, past the solid area 62, and through the holes 61 to the inlet check valve outlet chamber 42 and from there through the loading flow passage 43 to the pumping chamber 22. On the other hand, when the pumping mechanism 23 is pumping fluid, the relatively higher pressure in the inlet check valve outlet chamber 42 compared to that in the inlet check valve inlet flow path 36 urges the solid area 62 into substantially sealed engagement with the hole 60 preventing backflow of fluid into the fluid inlet 6. It will be appreciated that the portions of bottom surface 35 and top surface 41 which bound respective openings in such surfaces cooperate with each other and with both parts of the flexible member 13 to provide a fluid-tight seal not only at the pumping chamber 22 but also at the respective inlet and outlet check valves 20, 21 and at the loading flow passage 43 and outlet check valve fluid inlet passage 44. Thus, the check valve 20 operates on a differential pressure principle, has no independently movable parts, such as springs and balls, and has a relatively large flat seat area between at least one resilient and a second member, with all of the foregoing minimizing the amount of effort required to operate the check valve, the cost, and the servicing requirements thereof, while improving the effectiveness and longevity of the check valve.

Looking now at the outlet check valve 21, it is similar to the inlet check valve in form, operation and advantages. More particularly, the outlet check valve 21 includes a plurality of holes 63, preferably three holes, in the lower flexible member 12 and a much larger opening 64 through the upper flexible member 11, with such opening 64 being approximately the same size as that of the outlet check valve outlet chamber 37 and aligned approximately concentrically with respect to the same, as is illustrated in the drawings. The remote end of the outlet check valve fluid inlet passage 44 relative to the pumping chamber 22 aligns with a solid area 65 of the flexible member 12 approximately centered among the holes 63. In operation of the outlet check valve 21, when the pumping mechanism 23 is drawing fluid into the pumping chamber 22, the relatively low pressure created in the outlet check valve fluid inlet passage 44 draws the solid area 65 securely against the top surface 41 to prevent drawing in of fluid from the fluid outlet 7. On the other hand, when the pumping mechanism 23 pumps fluid from the pumping chamber 22, the relatively high pressure in the outlet check valve fluid inlet passage 44 urges the solid area 65 away from the top surface 41 as permitted preferably by the flexibility and preferred resiliency characteristic of the member 12 and additionally as permitted by the large opening 64, whereupon pumped fluid passes through the hole 63, through hole 64, and into the outlet check valve outlet chamber 37 from which the fluid may pass via the fluid outlet passage 34 to the fluid outlet 7. Thus it will be seen that in both check valves, operation of the same is due to a flexing type motion and preferably a resilient one in response to the differential pressure across the flexible member(s).

Although the preferred embodiment and best mode of the invention utilizes a plural part flexible member 13, it is believed that a more preferred flexible member 13', which is formed of a single molded part of, for example, Neoprene or like flexible and preferably resilient material, may be substituted for the plural part member 13 to facilitate manufacturing of the pump 1 and, accordingly, to reduce the cost thereof as well as additional areas of possible fluid leakage, say between the portions 11, 12. The flexible member 13' is illustrated in FIGS. 9 and 10 in which primed reference numerals designate parts in the member 13' corresponding to those in the member 13 described above and illustrated in FIGS. 3 and 6-8. The flexible member 13' illustrated in FIGS. 9 and 10 is formed of a single molded piece having a pair of relatively large circular recesses 66, 67, solid areas 62', 65', holes 61', 63', and central area 50'. The hole 61', solid area 62' and recess 66 operate in the inlet check valve, whereby the solid area 62' may block fluid flow from the inlet check valve inlet flow path 36 into the inlet check valve outlet chamber 42 during pumping and the solid area 62' flexes into the recess 66 during the re-loading or drawing of fluid into the pumping chamber 22, thereby allowing fluid flow through the holes 61'. The holes 63', solid area 65', and recess 67 operate similarly, vis-a-vis the outlet check valve fluid inlet passage 44 and outlet check valve outlet chamber 37 of the outlet check valve 21, to pass fluid to the fluid outlet during pumping and to block reverse fluid flow during the re-loading half cycle.

Figure 4:
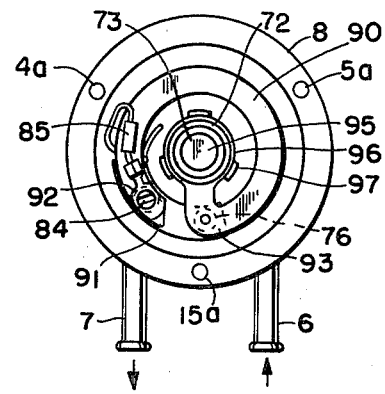
FIG. 4 is a top view of the pump looking generally in the direction of the arrows 4—4 of FIG. 3 but with the top of the pump case removed to show the contact carrier assembly.

Turning back to FIGS. 3 and 5, one lead 70 of the conductor forming the turns 40 of the solenoid 53 is threaded through an opening in the lower flange 30 of the bobbin 10 and is directed outward of the pump 1 for connection to a source of electrical power. The other lead 71, which is shown in FIG. 4, is connected intermittently via the energy controlling mechanism 24 also to such source of electrical power, not shown, to complete a circuit for the solenoid 53. A spring 72 provides a biasing force on an electrically non-conductive and non-magnetically responsive plunger 73, for example of nylon, which has an enlarged slug-like cylinder portion 74 positioned in the central passage 32 in engagement with the iron core 52, tending to urge the core 52 and, thus, the central area pumping diaphragm 50 into the pumping chamber 22 to pump fluid therein. For that purpose, the lower end of the core 52 engaged with the central area 50 is beveled at 75 to facilitate a gradual generally uniform deformation of the central area 50 during such pumping.

The spring 72 also tends to urge a movable electrical contact 76 toward the position shown in phantom to engage a relatively fixed electrical contact 77 in order to complete an electrical circuit for the solenoid 53. Upon such circuit completion, the energized solenoid draws the iron core 52 upward, whereupon the pumping mechanism 23 draws fluid into the pumping chamber 22. As the core 52 moves upward, the upper surface 78 of the slug-like plunger portion 74 separates the contacts 76, 77 de-energizing the solenoid 53, although the overall momentum of the core 52 and plunger 73 tends to continue drawing fluid into the pumping chamber 22 preferably until the upper surface 78 achieves a position approximately aligned with the lower surface 79 of a contact carrier assembly 80 to be described in greater detail below.

Thus, it will be appreciated that it is the force and, accordingly, the work input, provided by the spring 72 that effects a substantially constant pumping pressure on the fluid in the pumping chamber 22 during the pumping cycle of the fluid pump 1. If the force constant of the spring 72 is substantially linear, then the fluid pressure of the pumped fluid will remain substantially constant during the pumping cycle even over a relatively long period of time if the flow rate out of the fluid outlet 7 is relatively small. The time required for reloading the pumping chamber 22 during upward movement of the core 52 ordinarily will be relatively short and, therefore, preferably will not have a substantial effect on the average pressure of the pumped fluid and this is especially true if the total stroke distance of the solenoid, core 52, plunger 73, pumping diaphragm area 50 and spring 72 of the pumping mechanism 23 is maximized. Such stroke distance, of course, is a function of the permissible relative travel distance of the contacts 76, 77. Furthermore, it will be appreciated that it is most desirable that the fluid pumped by the fluid pump 1 is of an incompressible type, such as water, in order to optimize pump operation. However, it is possible that compressible fluids also may be pumped, although overall pumping efficiency may be reduced.

Moreover, in view of the foregoing, it will be appreciated that the actuator which provides a work input to the fluid pump 1 and in the preferred embodiment preferably is of the electromagnetic type, such as the solenoid 53, only is intermittently energized to store energy in the spring 72, thus minimizing the overall power input requirements of the fluid pump 1. The spring 72, on the other hand, assures a substantially uniform pumping output from the fluid pump 1. If desired, other types of actuators, preferably of the intermittently energizable type, which produce output work in response to an energy input may be substituted for the solenoid actuator 53.

The energy controlling mechanism 24 includes the contacts 76, 77, the contact carrier assembly 80, a fixed contact support 81 to which both the fixed contact 77 and lead 71 are electrically and mechanically connected, and an electrically non-conductive pedestal 82 for mounting the carrier assembly 80 spaced away from the upper surface 83 of the bobbin upper flange 31 and, of course, spaced away from the fixed contact 77 and its support 81. The fixed contact support 81 as well as the contact carrier assembly 80 may be formed of copper, brass, or other electrically conductive material. A screw 84 holds the carrier assembly 80 to the pedestal 82, secures the latter against the fixed contact support 81 holding the same in relatively fixed position engaged with the upper surface 83 of the flange 31, and passes in electrically insulated isolation through an opening in the fixed contact support 81 for securement in the upper flange 31. The screw 84 also preferably secures a completed circuit for a capacitor 85 to the carrier assembly 80. Such capacitor 85 also is electrically connected to the fixed contact support 81 in order to provide an arc suppressing function, vis-a-vis the contacts 76, 77 in conventional manner.

Turning now in detail to the contact carrier assembly 80, it is the purpose of such assembly to enable efficient electrical connections to be made between the movable and fixed contacts 76, 77, on the one hand, and an assured periodic interruption of such electrical connections, on the other hand, with a minimum of work effort required to effect the same. It is also desirable to maximize the movement distance and the repeatability of movement of the movable contact so that a relatively maximum surface area of the latter will engage a relatively maximum surface area of the fixed contact, thus providing efficient current carrying capability therebetween with minimum energy dissipation; this being in contrast to conventional contacts having predominantly point contact connections particularly in those instances that at least one of a pair of contacts is curved or spherical to accommodate possible differences in the cyclical movements of the contact pair.

To accomplish the foregoing and additional advantages mentioned below, it is desirable that the carrier arm 90 of the contact carrier assembly 80 have an adequate resiliency in the direction of usual movement, i.e. perpendicular to the direction of varying radius of curvature thereof, to assure periodic separation of the contacts and to enable periodic connection of the contacts with a minimum work effort required to effect the same. Moreover, to fit the carrier arm 90 within the confines of the fluid pump 1 while still maintaining the relatively long length thereof for optimum resiliency and, yet, relatively minimum force constant characteristics, the carrier arm 90 is curved in a polar or circumferential direction about the longitudinal central axis of the pump 1, as is seen most clearly in FIG. 4. One end 91 of the curved carrier arm 90 is fixed or secured by the screw 84 to the pedestal 82 and in electrical connection via a conventional electrical connector 92 with the capacitor 85. The other movable end 93 of the carrier arm 90 has the movable contact 76 attached thereto. A force applying arm 94 attached to and preferably integral with the movable end 93 extends radially inwardly toward the axial center 95 of the pump 1, and a force input end 96 integral with the arm 94 is circularly enlarged with respect to the latter to receive input force by the bottom end of the spring 72 engaged with the top surface thereof and by the upper surface 78 of the enlarged plunger portion 74 engaged with the bottom surface thereof and to accommodate the narrower upstanding rod-like portion of the plunger 73 in a central opening formed within such end 96. Upstanding tabs 97 integral with the circular end 96 hold the bottom portion of the spring 72 in position with respect to the contact carrier assembly 80 and a recess 98 in the top of the pump case 8 holds the upper end of the spring in the position shown in FIG. 3.

Although not shown as such in FIG. 3 for clarity of illustration, it will be appreciated that ordinarily the upper surface 78 of the enlarged plunger portion 74 will be engaged with the bottom surface of the circular force input end 96 of the arm 94. Moreover, the iron core 52 and bottom surface of the enlarged plunger portion 74 also preferably ordinarily will remain in mechanical engagement with each other. Therefore, when the solenoid actuator 53 has been energized upon a closure of the contacts 76, 77, and the pumping mechanism 23, including the central area 50, iron core 52, plunger 73, movable carrier arm end 93, force input end 96, and spring 72, will be forced initially by the work input of the solenoid actuator 53 and subsequently by momentum of the pumping mechanism 23 upward until the movable contact 76 has reached a relatively maximum spacing away from the fixed contact 77. Thereafter, with the solenoid actuator 53 deenergized, the spring 72 urges the remaining parts of the pumping mechanism 23 in a downward direction to pump fluid, as described above, while applying a force in a direction approximately parallel to the resiliency characteristic of the curved carrier arm 90 tending to move the movable end 93 thereof and, thus, the movable contact 76, toward the fixed contact 77; the next energization cycle occurs upon the touching of the contacts. If desired, the contacts 76, 77 themselves may be eliminated with simply the surfaces of the fixed contact support 81 and movable carrier arm 90 providing for electrical contact therebetween; nevertheless, for optimum efficiency and longevity it is desired to use the illustrated contacts.

Furthermore, in accordance with the preferred embodiment of the invention the contact carrier assembly 80 is formed of a flat disc-like member cut to the shape illustrated in FIGS. 3 and 4. The spring force constant of the force applying arm 94 preferably is appreciably greater than that of the curved carrier arm 90; this being accomplished, for example, by making the radial width of the arm 90 relatively thin and the width of arm 94 relatively large. Therefore, as the spring 72 and force applying arm 94 apply force in a vertical direction, i.e. into the plane of the paper relative to FIG. 4, to the movable end 93, there will be relatively little bending or torquing of the latter as it moves downward from the planar natural unstressed condition shown in FIG. 3. Moreover, due to the high level of resiliency, length, and relatively small spring force constant of the curved carrier arm 90, the latter may be moved repeatably over many cycles long distances without deformation of the same beyond its elastic limits without substantial fatigue and without substantial bending of the end 93 out of a plane parallel to its natural flat plane. Preferably the plane in which the arm 94 is naturally positioned, e.g. when it, as an integral part of the contact carrier assembly 80, and the latter assume a flat or coplanar configuration when unstressed, and those in which the arm 94 pass during movement are substantially parallel with each other and with that of the contacting surfaces of the contacts 76, 77; and preferably the plane in which the spring 72 and arm 94 interact and particularly in which the former applies force to the latter also is parallel to the aforesaid planes. Moreover, in view of the foregoing and since there is relatively little torquing of the curved arm 90 or pitching or yawing of contact 76, the actual movements of the movable contact are repeatable with a high degree of accuracy, and as a result there will be minimum wear on the contacts and optimum electrical connection efficiency between the contacts.

The capacitor 85 in conventional manner facilitates opening the contacts especially without arcing. The one piece contact carrier assembly 80 improves the operational efficiency of the pump 1 by eliminating any mechanical interconnections of contact supports, thereby eliminating a source of possible wear and failure.

As was mentioned above, one end of the conductor forming the turns 40 of the solenoid 53 is connected via lead 70 to a source of electrical power. The other end is connected via lead 71 and intermittently via the contacts 76, 77, when closed, contact carrier assembly 80, spring 72, and pump case 8 to the opposite polarity connection of such source of electrical energy. The preferred orientation for the pump 1 is in vertical direction as illustrated in FIG. 1 to avoid possibility of fluid leakage from the fluidics part below into the electrical part above.

Summarizing operation of the fluid pump 1, then, ordinarily the spring 72 urges the contacts 76, 77 to a closed condition and upon such closure of the contacts 76, 77, the energized solenoid 53 will cause the pumping mechanism 23 to effect a suction in the pumping chamber 22 drawing fluid from the fluid inlet 6 via the inlet check valve 20 into the pumping chamber 22 while the outlet check valve 21 remains closed. Thereafter, the spring 72 causes the pumping mechanism 23 to pump fluid out the outlet check valve to the fluid outlet 7 while the inlet check valve 20 remains closed. It will be appreciated that since the check valves operate only on differential pressure and not on the basis of any external mechanical means, such as additional springs, ball seals, or the like, the amount of energy dissipated thereat and required to operate the same is minimized while the overall longevity thereof is maximized.

I claim:

1. A fluid pump comprising a fluid inlet and a fluid outlet; a pumping chamber; an inlet check valve means for passing fluid flow from said fluid inlet to said pumping chamber and for blocking fluid flow from said pumping chamber to said fluid inlet; an outlet check valve means for passing fluid flow from said pumping chamber to said fluid outlet and for blocking fluid flow from said fluid outlet to said pumping chamber; pumping means for drawing fluid from said fluid inlet via said inlet check valve into said pumping chamber and for pumping fluid from said pumping chamber via said outlet check valve to said fluid outlet; at least one of said inlet and outlet check valve means comprising a self-sealing check valve assembly, including a first relatively rigid member having a plate-like surface and bounded by boundary portions of said surface; a second relatively rigid member having a plate-like surface and a fluid passage means opening at said plate-like surface of said second relatively rigid member and bounded by boundary portions of said plate-like surface of said second relatively rigid member; flexible means positioned between said plate-like surfaces for cooperating with said boundary portions to provide a substantially fluid-tight seal therewith; and said flexible means including movable means for moving upon flexure of said flexible means in response to a pressure differential across said flexible means, said movable means including means operative when said flexible means moves substantially to opposite extreme positions thereof to block fluid flow between said fluid passage means and to permit such fluid flow, respectively; said flexible means having plural flexible parts each having a resilient characteristic, one of said parts having a surface area portion for blocking fluid flow through at least one of said inlet check valve means and outlet check valve means in response to one directional pressure differential thereacross and being capable of permitting fluid flow through said at least one check valve means in response to an opposite direction pressure differential thereacross, and the other of said parts having an opening aligned with at least one of said fluid passage means and with said surface area of the one of said parts, said opening being adequately large to permit flexible deformation of said other part into said opening.

2. A fluid pump comprising a fluid inlet and a fluid outlet; a pumping chamber; an inlet check valve means for passing fluid flow from said fluid inlet to said pumping chamber and for blocking fluid flow from said pumping chamber to said fluid inlet; an outlet check valve means for passing fluid flow from said pumping chamber to said fluid outlet and for blocking fluid flow from said fluid outlet to said pumping chamber; pumping means for drawing fluid from said fluid inlet via said inlet check valve into said pumping chamber and for pumping fluid from said pumping chamber via said outlet check valve to said fluid outlet; at least one of said inlet and outlet check valve means comprising a self-sealing check valve assembly, including a first relatively rigid member having a plate-like surface and bounded by boundary portions of said surface; a second relatively rigid member having a plate-like surface and a fluid passage means opening at said plate-like surface of said second relatively rigid member and bounded by boundary portions of said plate-like surface of said second relatively rigid member; flexible means positioned between said plate-like surfaces for cooperating with said boundary portions to provide a substantially fluid-tight seal therewith; and said flexible means including movable means for moving upon flexure of said flexible means in response to a pressure differential across said flexible means, said movable means including means operative when said flexible means moves substantially to opposite extreme positions thereof to block fluid flow between said fluid passage means and to permit such fluid flow, respectively; said flexible means having plural flexible parts each having a resilient characteristic, one of said parts having a surface area portion for blocking fluid flow through at least one of said inlet check valve means and outlet check valve means in response to one directional pressure differential thereacross and being capable of permitting fluid flow through said at least one check valve means in response to an opposite direction pressure differential thereacross, and the other of said parts having a flow opening therein providing a fluid continuation of one of said fluid passage means in said first relatively rigid member, said surface area portion of the one of said parts being aligned with said flow opening on one side and on the other side aligned with a fluid chamber in said second relatively rigid member said fluid chamber being adequately large to permit deformation of said surface area portion of said other of said parts into said fluid chamber allowing fluid flow through such check valve.

3. The pump of claims 1 or 2, said first relatively rigid member of each self-sealing check valve means comprising a common plate-like member with said fluid passage means thereof being at different areas and opening at different surface areas thereof, and said second relatively rigid member of each self-sealing check valve means comprising a common plate-like member with said fluid passage means thereof being at different areas and opening at different surface areas thereof, and said flexible means comprising a common flexible means for both of said check valves.

* * * * *